(No Model.)
E. W. FANT, W. B. ANDERSON & S. W. RICHARD.
TOOL HANDLE ATTACHMENT.
No. 447,052. Patented Feb. 24, 1891.
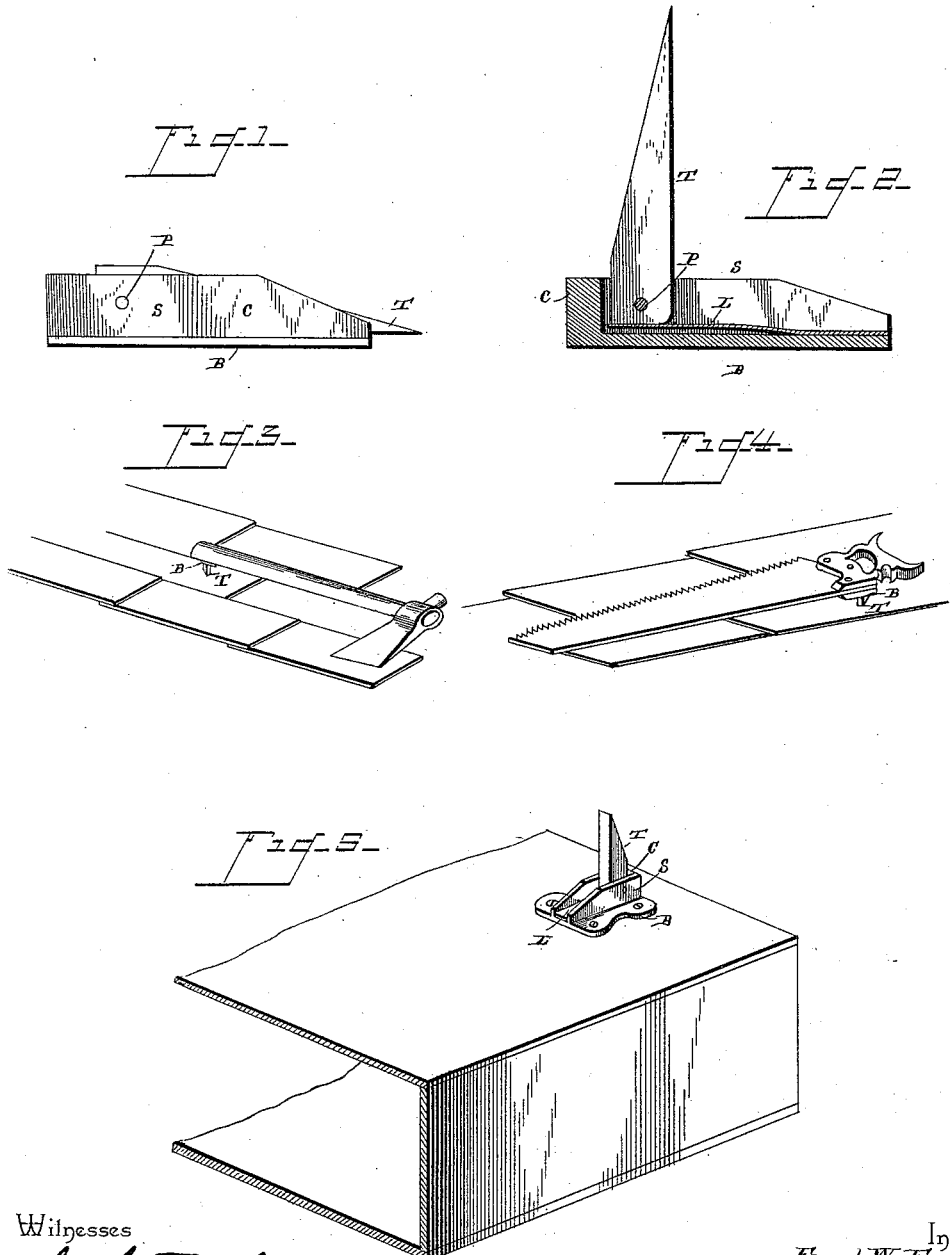
Witnesses
Inventors
Enoch W. Fant
William B. Anderson
Samuel W. Richard
By their Attorneys,

United States Patent Office.

ENOCH W. FANT, WILLIAM B. ANDERSON, AND SAMUEL W. RICHARD, OF FRANKLIN, WEST VIRGINIA.

TOOL-HANDLE ATTACHMENT.

SPECIFICATION forming part of Letters Patent No. 447,052, dated February 24, 1891.

Application filed June 30, 1890. Serial No. 357,926. (No model.)

*To all whom it may concern:*

Be it known that we, ENOCH W. FANT, WILLIAM B. ANDERSON, and SAMUEL W. RICHARD, citizens of the United States, residing at Franklin, in the county of Pendleton and State of West Virginia, have invented a new and useful Tool-Handle Attachment, of which the following is a specification.

This invention relates to wood-working tools, and more especially to the handles thereof; and the same consists in an attachment adapted to be applied to such handles to prevent the tool from slipping off an inclined roof when laid thereon by the user.

To this end the invention consists in the details of construction hereinafter more fully described, and illustrated in the drawings, in which—

Figure 1 is a side elevation of the attachment in its closed position. Fig. 2 is a central transverse section of the same in its open position. Fig. 3 is a perspective view of a hatchet, and Fig. 4 of a saw, with our improved attachment applied thereto. Fig. 5 is a perspective view of the attachment with the tooth raised, showing the former as secured by screws to the bottom of a box, as a miter-box, which is shown inverted.

Referring to the said drawings, the letter B designates the base, upon the outer face of which is formed a raised socket S of about the shape shown in Fig. 5, and within this socket, near the closed end C thereof, on a pivot P, is mounted a sharp tooth T, having corners at its lower end. A leaf-spring L is secured to the base near the outer end of the socket and bears upwardly against one side of the tooth when the latter is closed, or against the end of the same when it is open.

This attachment is applied to the handle of a saw, a hatchet, or any other tool of similar character, or it may be applied to the bottom of a miter-box, tool-box, or receptacle for nails, &c., as shown in Fig. 5, ordinary screws being passed through holes in the base to secure the attachment in position.

Care must be taken that the attachment be applied at one end (preferably the lighter) of the tool, the tool-handle, or the box, and that the open end of the socket S stand toward the other end. Under ordinary circumstances when the tooth is in closed position, as seen in Fig. 1, the attachment is not the least in the way, being very small in size; but when it is desired to use the tool or tool-box upon a slanting roof, as shown in Figs. 3 and 4, the tooth T is raised so that its rear side will stand against the closed end C of the socket, after which the tool or box may be dropped or placed upon the roof, and the pointed or sharpened end of the tooth will slightly embed itself into the same and prevent the tool or box from slipping off.

It will be obvious that a number of these attachments can be secured to the bottom of a box, and that one can be placed on each side of a saw or hammer handle. The attachment is preferably of metal, with a steel tooth, which latter may be ground from time to time as it becomes dulled by constant use.

What we claim is—

The combination, with a tool, of an attachment secured to the lower side thereof near one end, the said attachment comprising a base B, a socket S thereon, having one closed end C, a pointed tooth T, having a squared butt mounted on a pivot P within said socket and striking said closed end when the tooth is raised, and a leaf-spring L, secured in the outer end of said socket, with its free end bearing upwardly against said tooth, the open end of the socket standing toward the opposite end of the tool, and the whole adapted for use substantially as and for the purpose hereinbefore set forth.

In testimony that we claim the foregoing as our own we have hereto affixed our signatures in presence of two witnesses.

ENOCH W. FANT.
WILLIAM B. ANDERSON.
SAMUEL W. RICHARD.

Witnesses:
LEE BENNETT,
J. W. MORRAL.